March 27, 1951     H. V. SCHWANDT     2,546,277
STRAIGHT-LINE SWINGING SAW
Filed Jan. 29, 1947     2 Sheets-Sheet 1
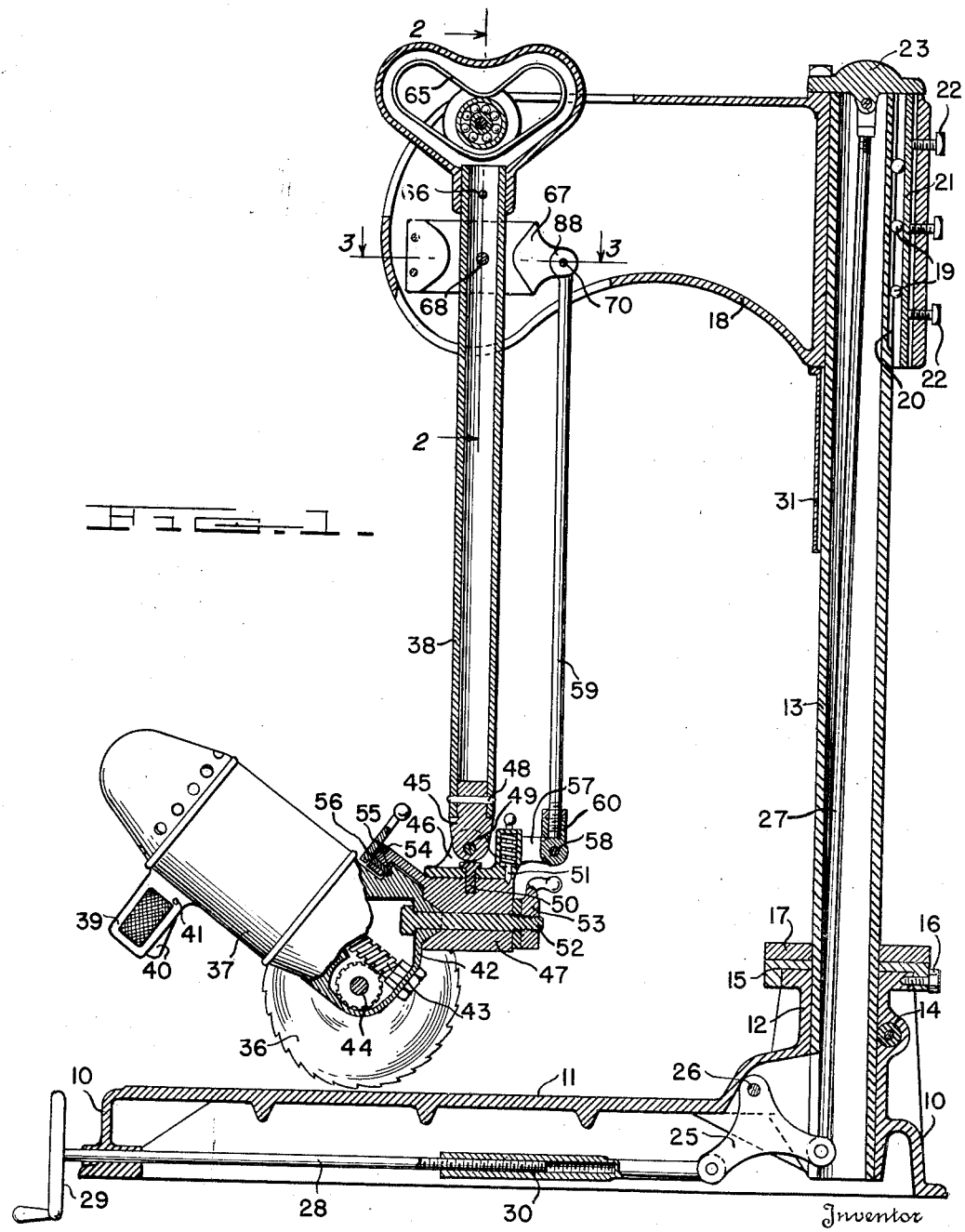
Inventor
Howard V. Schwandt
By Donald E. Lane
Attorney

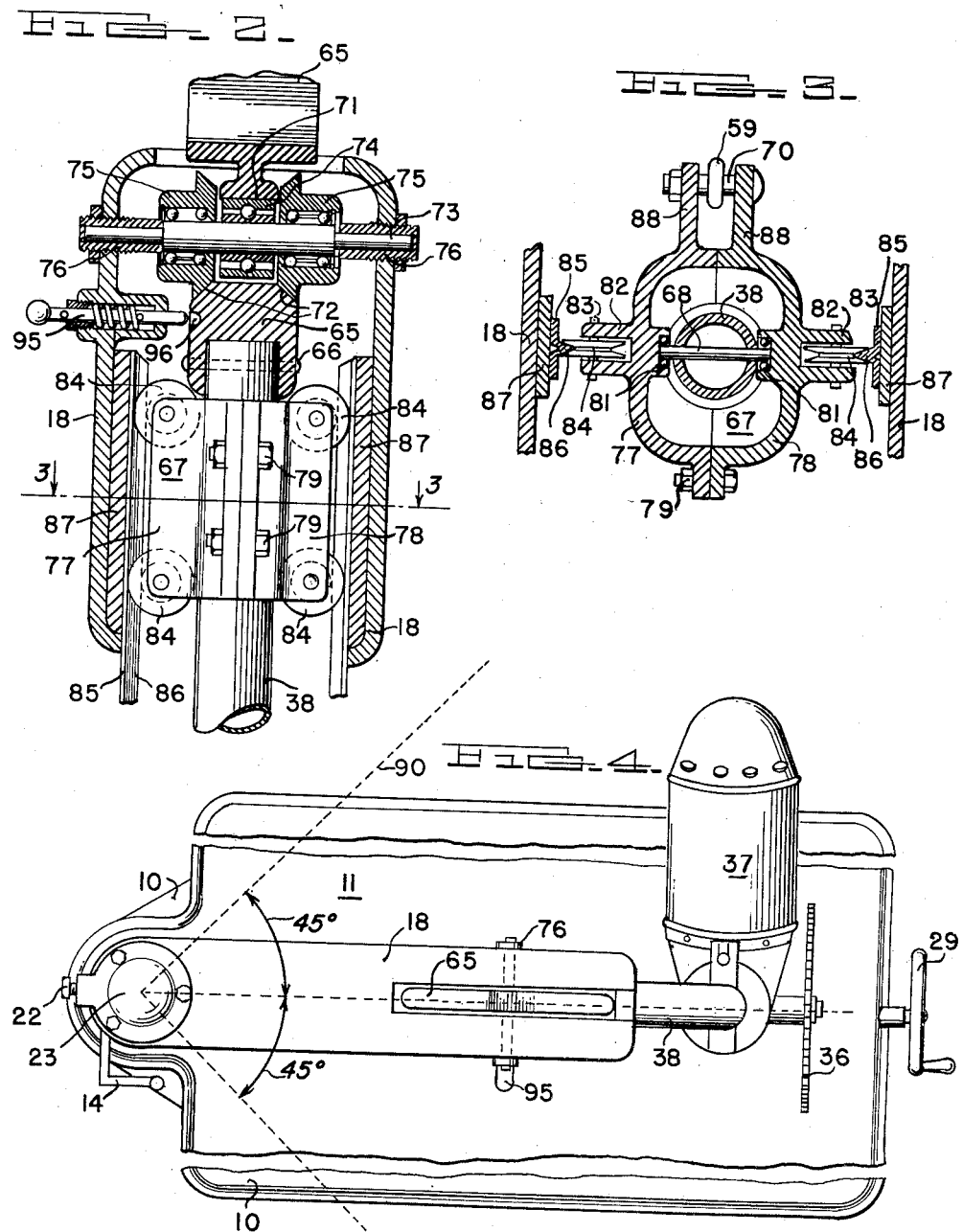

Patented Mar. 27, 1951

2,546,277

UNITED STATES PATENT OFFICE 2,546,277

STRAIGHT-LINE SWINGING SAW

Howard V. Schwandt, Weston, Oreg.

Application January 29, 1947, Serial No. 724,965

11 Claims. (Cl. 143—46)

This invention relates to improvements in a saw construction, and more particularly to a power driven swinging cut-off saw which may also be used as a rip saw as well as for other sawing operations.

The improved saw unit and its support described herein may be used for several types of sawing operations, such as for cross-cut or cut-off sawing, for angular cut-off sawing, for double-angle cut-off sawing such as in cutting a double forty-five degree cut, for rip sawing, and for edge grooving. The saw is provided with a novel swinging support which permits the suspended saw to be easily swung in a horizontal straight line path across a work table, as distinguished from saws which swing in an arc of a circle.

It is an object of this invention to provide a saw construction in which the saw is supported over a work table for movement in a straight line for straight cut-off, for angular cut-off, and for double-angle cut-off sawing.

It is another object of this inventon to provide a saw construction supporting a power driven saw above a work table so that the saw may be used for cross-cutting, rip-cutting, and edge-groove sawing.

It is another object of this invention to provide a saw construction in which a suspended power driven saw may be easily moved by hand in a straight line path across a work table at a desired distance above the surface of the work table.

It is a further object of this invention to provide an improved mounting for a swinging power driven saw which permits the saw to be easily and quickly adjusted for various types of cutting operations, and which permits the saw and its motive power to be easily removed from the mounting for use as a portable sawing unit when desired.

It is a still further object of this invention to provide an improved power driven saw which may be easily moved from one construction job to another, and which is capable of performing all the various types of sawing operations common to building construction work.

Numerous other objects and advantages of the invention will be readily apparent from the following detailed description of a preferred embodiment of the invention illustrated in the accompanying drawings, wherein:

Figure 1 is an elevational view in section of a saw construction embodying my invention.

Figure 2 is a vertical section view taken on line 2—2 of Figure 1 showing details of the saw support mechanism.

Figure 3 is a horizontal section view taken on line 3—3 of Figures 1 and 2 showing further details of the saw support mechanism.

Figure 4 is a plan view of the saw construction shown in Figure 1, but with the saw swung to an outward position and turned to the rip position.

Referring to Figure 1, for the purposes of illustration, the saw construction is provided with a base 10, preferably of cast metal, having a flat work table 11 integral therewith. A wooden top of plywood or the like may be clamped on the work table 11 to prevent the saw from cutting grooves in the table 11. The table 11 may be approximately square and the base 10 is provided with an uptsanding socket 12 at the rear thereof to support the vertical post or standard 13. A wedging clamp 14 is provided in the socket 12 to rigidly clamp the post 13 to the socket and base. Where the base 10 and socket 12 are made from an aluminum or other light metal casting, a steel bearing washer 15 may be secured to the upper edge of the socket 12 by screw 16, and a thrust collar 17 may be secured to the post 13 above the washer 15.

The head member 18 may also be a casting of light metal and is provided with a vertical bore to receive the upper end of the post 13. To permit free movement of the head 18 upon the upper end of post 13, there are provided a plurality of ball bearings 19 positioned in a vertical groove 20 in the post 13 and bearing against a vertical wear strip 21 adjustably positioned in a vertical groove in the bore of the head 18 by screws 22. A cap 23 is secured to the head 18 over the bore to limit downward movement of the head on the post 13. For adjusting the vertical position of head 18 with respect to the supporting post 13, there is provided a lever 25 pivoted at 26 to the base 10 and connected to the head cap 23 by a rod 27 within the post 13. The lever 25 is also connected by an adjustable-length rod 28 to a hand wheel 29 on the front of the base 10. Where the rod 28 is journaled in the front edge of base 10, suitable thrust bearings may be provided to prevent axial shifting of the rod 28 and to prevent binding of the rod in the bearing. Rotation of the wheel 29 clockwise causes the right hand portion of the rod 28 to extend by virtue of the threaded coupling 30 to shift the lever 25 counter-clockwise from the position illustrated, thereby causing the connecting rod 27 to raise the head 18 on post 13. This means is provided to adjust the distance of saw cut above the table 11. A suitable scale may be secured to or marked on the post 13 for cooperation with a pointer 31 extending downward from the head 18 to indicate the distance of the saw 36 from a wooden top on the table 11.

The rotary saw 36 and its driving motor 37 are supported from the head 18 by a swinging arm 38. The electric motor 37 may be provided with a pistol type hand grip 39 having a locking switch 40 and a switch release button 41. A suitable line cord, not illustrated, is provided, and may, if desired, lead through the arm 38 and through head 18 to the power supply. The motor casing 42 carries the rotary saw 36 on a spindle 44, and the motor 37 is geared to drive the saw through suitable gearing, such as the worm drive 43. The saw drive spindle 44 is adapted to have the saw 36 secured to either end thereof, so that the saw may be positioned on either side of the motor casing 42. The motor casing 42 is adjustably and detachably secured to the supporting arm 38 by means of connecting members 45, 46, and 47. Member 45 is rigidly secured to the lower end of arm 38 by a pin 48 or the like, and is provided with a bearing to receive the horizontal pivot pin 49. The member 46 is also provided with bearings for the pin 49. The member 47 is secured to member 46 by a vertical pivot 50 which permits the member 47 to be turned about a vertical axis with respect to member 46. A spring-biased detent 51 carried by the member 46 is provided for engagement with a series of openings in member 47 to lock the members 46 and 47 in any selected relative position. The motor casing 42 is secured to member 47 by a horizontal pivot bolt 52 having a wing nut 53 to lock the adjustment, and to permit removal of the complete motor and saw assembly when it is desired to use said assembly as a portable saw unit. The member 47 may be provided with a projecting arm 54 extending along the side of the motor casing 42, the latter being formed with a circumferential shoulder 55 provided with spaced openings to receive the end of a locking detent 56 carried in the arm 54. Member 46 is provided with a projecting lug 57 carrying a horizontal pivot pin 58. A tie rod 59 having an adjustable bearing fork 60 extends upward into the head 18, the rod 59 being parallel to the arm 38, the fork 60 being pivoted on the pin 58, and the upper end of rod 59 being pivoted on pin 70.

The supporting mechanism for arm 38 and rod 59 is carried by the head 18 and includes a cam member 65 secured to the upper end of arm 38 by a pin 66, and a yoke member 67 also secured to the arm 38 by a horizontal pivot pin 68.

Referring particularly to the construction illustrated in Figure 2. the cam member 65 has an internal track or cam surface having parallel opposed faces 71 and 72. Adjustably secured in the head 18 is the horizontal spindle 73 supporting a bearing 74 which engages face 71 of the cam member 65. Also supported on the spindle 73 is a pair of cam follower rollers 75 having bevelled peripheries which engage the faces 72 of cam member 65. The sleeves 76 supporting the spindle 73 may be adjusted toward each other to prevent play in the contact of bearing 74 against cam face 71 and in the contact of rollers 75 against cam faces 72. The bearing 74 and the rollers 75 are preferably mounted on the spindle 73 with ball or roller bearings to minimize friction and wear.

The yoke 67 may be formed of two sections 77 and 78, as shown in Figure 3, the sections being fastened together by bolts 79. The sections 77 and 78 surround the arm 38 and the horizontal pivot pin 68 secured to and extending through the arm 38, has its ends journaled in bearings 81 in the yoke sections. The yoke sections are provided with projecting lugs 82 provided with bearing pins 83 for the grooved rollers 84, there being two rollers 84 on each side of the assembled yoke member. The rollers 84 on each side of the yoke member are in vertical alignment and cooperate with vertical guides or tracks 85, the tracks 85 having a raised center portion 86 and being secured to spaced plates 87 which are secured to the inner surfaces of the head 18. The tracks are mounted so that the yoke member 67 is permitted to move only in a vertical direction. Lugs 88 projecting from the yoke sections support a bearing pin 70 parallel to pin 68, the pin 70 being engaged by the upper portion of tie rod 59. It is to be understood that the tracks 85 and rollers 84 limit the movement of the yoke 67 and pin 68 to straight line movement in a vertical direction.

Since pins 68 and 70 are in a horizontal plane, and since pins 49 and 58 are also in a horizontal plane, the arm 38 and tie rod 59 form two sides of a parallelogram construction which maintains the lower surface of the member 46 always horizontal as the arm 38 is swung forward and backward about the pivot 68.

In operation, the rotary saw 36 with its motor 37 may be swung toward or away from the post 13 for cutting material placed on the table 11. The supporting linkage provides that the saw 36 and its spindle 44 always move in a straight line path as the arm 38 is swung backwards and forwards. This straight line cutting action is accomplished by means of the cam member 65 which lowers the arm 38 gradually as it is swung from the vertical position shown in Figure 1 back toward the post 13. Likewise as the saw is swung forward, the arm 38 and associated linkage is gradually raised by the cam member 65 until it reaches the vertical position illustrated, and it is then lowered as the arm 38 is swung outward to the front of the table 11. By this mechanism the lowest cutting edge of the saw 36 is always maintained a set distance above the table 11 and work placed on a top on the table 11 for sawing may be cut with an even or full depth cut. The depth of the saw cut may be adjusted by operation of the hand wheel 29 which serves to raise or lower the head 18 on the post 13 until the saw 36 is the desired distance above the table 11. The operation described above is used for crosscut sawing where material is to be sawed into or to be sawed off in a direction perpendicular to its length.

Where it is desired to make saw cuts on an angle to the length of the material, as in cutting the ends of rafters for sloping roofs, the head 18 and its supporting post 13 may be turned in the base 10 after loosening the wedge clamp 14. The head is turned to the desired angle and the post 13 locked in the new position by the clamp 14. As indicated by the dotted lines 90 and 91 in Figure 4, the head 18 may be swung to any angle up to forty-five degrees either side of the crosscut position.

Where it is desired to use the saw as a rip saw, the arm 38 may be swung to the forward position, shown in Figure 4, and is then locked in such position against swinging by shifting the detent 95 into engagement with a suitable aperture 96 in the member 65, as shown in greater detail in Figure 2. The detent 51 is then lifted while the saw and motor assembly is turned ninety degrees on the pivot 50 where it is then locked by detent 51 in the rip position with saw 36 in a vertical plane parallel to the length of the material to be rip-sawed.

The rip saw construction herein described also permits saw cuts to be made on a double forty-five degree angle, as for use in cutting the ends of hip roof rafters or the like. For such operations, the clamp nut 53 is loosened and the detent 55 lifted permitting the motor frame 42 to be tilted on bolt 52 until the saw spindle 44 is at a forty-five degree angle with the surface of table 11. The head 18 is then swung laterally to the forty-five degree position and locked. The saw is then ready to be swung forward and backward to cut on the double forty-five degree angle.

It is to be understood that the saw construction described is capable of many various angular adjustments not limited to the forty-five degree angles mentioned. For example, the saw assembly may be turned on pivot 52 until the saw spindle 44 is perpendicular to the plane of table 11 for edge grooving or the like. The saw 36 may be secured on either end of the drive spindle 44 for the convenience of either left-handed or right-handed saw operators.

Suitable work or material holding or positioning devices may be secured to the table 11 or to slides on the sides of the base 10 as is well known in the art. One form of a traveling fence construction particularly suitable for use with the saw construction illustrated and described herein is disclosed in my copending application Serial Number 729,619, filed February 19, 1947, now Patent No. 2,483,326, dated September 27, 1949.

Obviously many variations in the nature and arrangement of the various elements described will be readily evident to those skilled in this art, and this invention contemplates any such equivalent structure within the scope of the following claims.

I claim:

1. A saw mechanism comprising in combination, a supporting head, an arm extending downward from said head, a rotary saw and support therefor pivotally secured to the lower end of said arm, said support being pivotal on an axis at right angles to the longitudinal axis of said arm, a bearing supported on a horizontal axis by said head, a cam secured to the upper end of said arm and engaging said bearing, a yoke pivotally connected to said arm adjacent said cam, vertical guide means carried by said head for said yoke, and a tie rod conecting said yoke to said saw support, said cam being shaped to cooperate with said bearing to lower said arm when the latter is swung away from a vertical position whereby said saw may be swung back and forth in a straight horizontal path, said tie rod being substantially parallel to and spaced from said arm for turning said saw support on its pivotal mounting as said arm is swung back and forth.

2. A saw mechanism comprising in combination, a supporting head, an arm extending downward from said head, a plate pivotally connected to the lower end of said arm, a rotary saw and motive power therefor secured to the lower side of said plate, a bearing supported on a horizontal axis by said head, a cam secured to the upper end of said arm for engagement with said bearing, a yoke pivotally connected to said arm on a horizontal axis, a guide secured to said head for guiding movement of said yoke in a vertical direction, a tie rod pivotally connected to said yoke and to said plate and being parallel to and spaced from said arm, said cam being shaped to lower said arm, said yoke, and said plate, when the arm is swung away from a vertical position whereby the said plate remains in a single horizontal plane as the saw is swung back and forth in a straight horizontal path.

3. A saw mechanism comprising in combination, a supporting head, an arm extending downward from said head, a connecting member pivotally secured to the lower end of said arm on a horizontal axis, a rotary saw detachably secured to said connecting member, a bearing supported on a horizontal axis by said head, a cam secured to the upper end of said arm for engagement with said bearing, a yoke pivotally connected to said arm on an axis parallel to the axis of said bearing, guides for restricting said yoke to vertical movement, a tie rod pivotally connected to a portion of said yoke and pivotally connected to a portion of said connecting member whereby the latter moves in a single horizontal plane as the saw secured thereto is swung back and forth in a straight horizontal path.

4. A saw mechanism comprising in combination, a work table, a standard extending upward from said table, a head secured to said standard and projecting over said table, an arm depending from said head, a power driven saw secured to the lower end of said arm, a bearing carried by said head, a cam on the upper end of said arm engaging said bearing, a yoke pivotally connected on a horizontal axis to said arm and guided for vertical movement in said head, said cam being shaped to cooperate with said bearing to lower said arm when the latter is swung away from a vertical position whereby said saw may be swung back and forth in a straight horizontal path across said table.

5. A saw mechanism comprising in combination, a work table, a standard extending upward from said table, a head secured to said standard and projecting over said table, an arm depending from said head, a power driven saw pivotally supported by the lower end of said arm, a bearing supported on a horizontal axis by said head, a cam secured to the upper end of said arm for engagement with said bearing, a yoke pivotally connected to said arm adjacent said cam and guided for vertical movement in said head, a tie rod pivotally connected at its upper end to said yoke and pivotally connected to said saw support, whereby said saw may be swung back and forth in a straight horizontal path.

6. A saw mechanism comprising in combination, a work table, a standard extending upward from said table, a head slidably secured on said standard and projecting over said work table, an arm depending from said head, a power driven saw supported by the lower end of said arm, a bearing supported on a horizontal axis by said head, a cam secured to the upper end of said arm for engagement with said bearing, a yoke pivotally connected to said arm and guided for vertical movement in said head, and extensible linkage between said work table and said head for adjusting the position of said head on said standard, whereby said saw may be swung back and forth in a straight horizontal path a desired distance above the surface of said work table.

7. In a saw mechanism as set forth in claim 4, a socket secured to said work table for supporting the lower end of said standard, and a clamp engaging said socket and said standard to lock said standard in a desired position with respect to said work table.

8. In a saw mechanism as set forth in claim 4, said cam having spaced cam surfaces and said bearing supported by said head being adjustable to engage said spaced cam surfaces.

9. In a saw mechanism as set forth in claim 6, two connecting members between the lower end of said arm and said power driven saw, the first of said members being pivoted to said arm on a horizontal axis, the second of said members being pivoted to said first of said members on a vertical axis, and a detent carried by said first member to lock the second member against rotation on said vertical pivot.

10. In a saw mechanism as set forth in claim 5, two connecting members between the lower end of said arm and said power driven saw, the first of said members being pivoted to said arm on a horizontal axis, the second of said members being pivoted to said first member on a vertical axis, and said saw being pivoted to said second member on a horizontal axis.

11. In a saw mechanism as set forth in claim 6, said standard having a vertical groove in the upper portion thereof, said head having a vertical groove therein opposed to the vertical groove in said standard, and a plurality of ball bearings positioned in said opposed grooves.

HOWARD V. SCHWANDT.

REFERENCES CITED

The following references are of record in the file of this patent:

UNITED STATES PATENTS

| Number | Name | Date |
|---|---|---|
| 370,962 | Martin | Oct. 4, 1887 |
| 1,662,087 | Thomas | Mar. 13, 1928 |
| 1,764,965 | Madsen | June 17, 1930 |
| 2,320,743 | Nilsen et al. | June 1, 1943 |
| 2,382,971 | Brocco et al. | Aug. 21, 1945 |
| 2,389,296 | Crane | Nov. 20, 1945 |

FOREIGN PATENTS

| Number | Country | Date |
|---|---|---|
| 549,757 | France | Nov. 28, 1922 |
| 691,648 | Germany | June 1, 1940 |